United States Patent [19]
Schroeder

[11] Patent Number: 6,100,682
[45] Date of Patent: Aug. 8, 2000

[54] THREE-ELEMENT ANGULAR POSITION SENSOR

[75] Inventor: Thaddeus Schroeder, Rochester Hills, Mich.

[73] Assignee: General Motors Corporation, Detroit, Mich.

[21] Appl. No.: 09/162,077

[22] Filed: Sep. 28, 1998

[51] Int. Cl.[7] .............................. G01B 7/30; G01R 33/09
[52] U.S. Cl. ................. 324/207.21; 324/207.25
[58] Field of Search ........................... 324/207.19, 207.2, 324/207.21, 207.23–207.25, 252; 338/32 R, 32 H

[56] References Cited

U.S. PATENT DOCUMENTS

| 5,668,471 | 9/1997 | Lequesne et al. | 324/207.21 |
| 5,731,702 | 3/1998 | Schroeder et al. | 324/207.21 |

*Primary Examiner*—Jay Patidar
*Attorney, Agent, or Firm*—Margaret A. Dobrowitsky

[57] ABSTRACT

A device for sensing angular positions of a rotating ferromagnetic target wheel which has teeth and slots along its periphery. A magnetic sensor is positioned adjacent the target wheel. The sensor has a biasing magnet and three sensing elements mounted on the biasing magnet. The sensing elements are sequentially positioned and equally spaced such that their output signals are equally phase shifted by an angle corresponding to their positions. Each sensing element is responsive to the passage of each tooth adjacent the sensing element. The leading and trailing edges of each tooth represent an angular position of the target wheel. Transition points between the leading and trailing edges are determined by obtaining differential signals between the first sensing element and the second sensing element and between the second sensing element and the third sensing element and then finding their crossover points. The crossover points are used to determine the angular positions of the target wheel.

8 Claims, 2 Drawing Sheets

THREE-ELEMENT ANGULAR POSITION SENSOR

TECHNICAL FIELD

This invention relates to a device for detecting angular positions of a rotating object, and more particularly to a magnetic sensor having three magnetic sensing elements to detect angular positions of a rotating ferromagnetic wheel.

BACKGROUND OF THE INVENTION

It is known in the art relating to magnetic sensors to provide a sensor that determines the angular rotation of a ferromagnetic object by magnetically sensing changes in a magnetic field caused by movement of the ferromagnetic object through the magnetic field.

One application of such a sensor is used to determine the speed or angular position of an engine crankshaft for ignition timing. A wheel of the crankshaft has teeth spaced around its circumference that project toward the sensing device. As the crankshaft rotates, each tooth passes by the sensor and the strength of the sensor's magnetic field increases in the spatial area of the sensor. Subsequently, the strength of the magnetic field decreases as the tooth moves away from the sensor. The changes in the magnetic field can be used to determine the speed or angular position of the crankshaft.

Several types of sensors may be used to detect the changes in a magnetic field. One such device is called a Hall effect sensor; another is called a magnetoresistive sensor. A Hall effect sensor may have two magnetic sensing elements positioned adjacent a target wheel which has teeth and slots along its periphery. The voltage across the sensing elements changes with the passage of a tooth or a slot. The sensing elements generate two identical signals phase shifted by an angle corresponding to their spacing. One of the signals is subtracted from the other. The resultant differential signal is compared with a fixed threshold level in order to generate a digital signal corresponding to the teeth and slots of the target wheel.

The magnetic field strength of the sensor decreases in air as a function of the squared distance from the source. Accordingly, as an air gap between the sensor and the target wheel increases, the tooth/slot output voltage of the sensor decreases. When the sensor operates over a range of air gaps, the threshold level must be set low enough to intercept the lowest signal which occurs at the highest air gap and operating temperature. At smaller air gaps and/or lower temperatures the signal magnitude is larger and it crosses the fixed threshold level at a different point. This results in the sensor's dependence upon temperature and the air gap which both affect the ability to get an accurate reading.

A magnetoresistive sensor is a device whose resistance varies with the strength of a magnetic field applied to the device. The magnetoresistor is mounted within and perpendicular to a magnetic flux developed between a biasing magnet and a target wheel which has teeth and slots along its periphery. When the target wheel rotates, it moves linearly toward and away from the magnetoresistor. In doing so, it changes the reluctance of the magnetic circuit involving the sensor. This causes the magnetic flux through the magnetoresistor to vary in a manner corresponding to the position of the teeth and/or the slots of the target wheel. With the change in magnetic flux, there occurs a corresponding change in the magnetic field strength to which the sensor is exposed. A higher magnetic field strength increases the resistance and a lower magnetic field strength decreases the resistance. The changes in the magnetic field can be used to determine the angular position of the target wheel.

Such a device is disclosed in U.S. Pat. No. 5,754,042, assigned to the assignee of the present invention and issued May 19, 1998. The magnetoresistive sensor includes a biasing magnet and two magnetoresistors. The two magnetoresistors are mounted on a biasing magnet which is positioned adjacent a target wheel having teeth and slots along its periphery. The distance between the two magnetoresistors relative to teeth on the target wheel is such that their analog signals are phase shifted by 180°, resulting in time overlapping signals which intersect at precise angular positions of the target wheel. The intersection points can be used to determine the angular positions of the target wheel. By eliminating the use of a reference voltage to determine such angular positions, the accuracy of the sensor is independent of temperature and changes in air gap between the sensor and the target wheel. To achieve the desired phase shift, one sensor must detect a leading edge of a tooth while the other sensor detects a trailing edge of a tooth. Determination of the precise length of the slots is also required to produce the desired magnetoresistor output signals. The tooth/slot configuration of the target wheel is directly related to the positioning of the magnetoresistors.

SUMMARY OF THE INVENTION

The present invention is directed to a device for detecting angular positions of a rotating ferromagnetic target wheel. The wheel has teeth, separated by slots, circumferentially spaced around the periphery of the wheel. A magnetic sensor is positioned adjacent the wheel. The sensor has three sensing elements.

The sensing elements are equally spaced relative to each other such that their signals are equally phase shifted by an angle corresponding to their positions. Each signal has an amplitude that changes in response to the passage of each tooth adjacent the sensing element. The transition points between leading and trailing edges of each tooth are determined by obtaining differential signals between a first sensing element and a second sensing element and between the second sensing element and a third sensing element and then finding their crossover points. The crossover points occur at different angular positions of the target wheel. By locating the crossover points between the two differential signals the need for a reference voltage is eliminated and thus the accuracy of the sensor is independent of temperature and changes in air gap between the sensor and the target wheel. Also, the determination of the precise length of the slots is not required to accurately determine the angular positions of the target wheel.

These and other features and advantages of the invention will be more fully understood from the following description of certain specific embodiments of the invention taken together with the accompanying drawings.

DESCRIPTION OF THE PREFERRED EMBODIMENT

Figure 1:
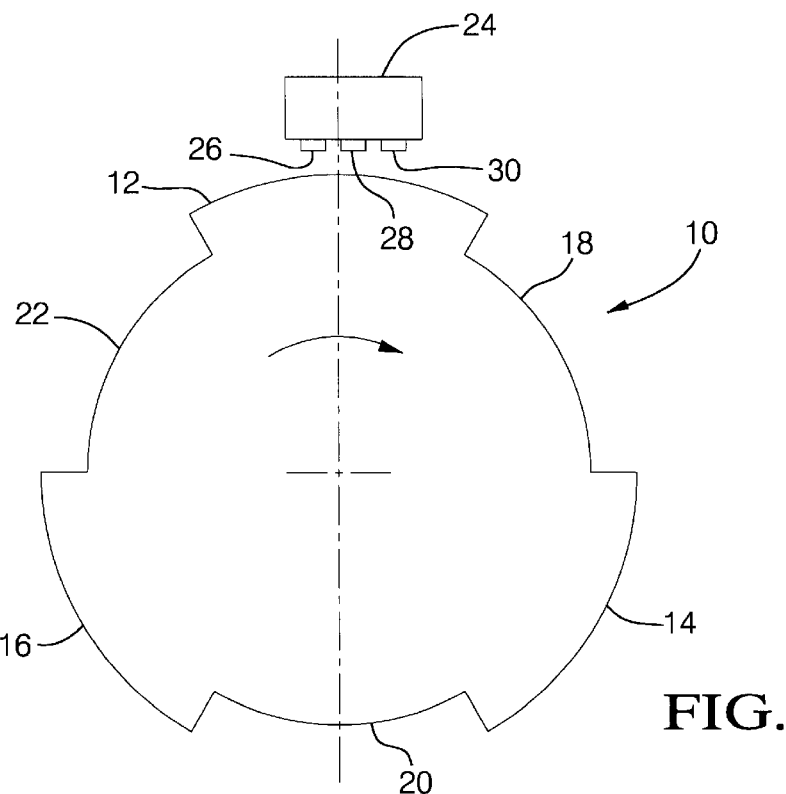
FIG. 1 is a plan view of a sensor and an associated target wheel in accordance with the present invention.

Referring now to FIG. 1 of the drawings in detail, numeral 10 generally indicates a ferromagnetic target wheel. The target wheel 10 is attached to and rotated by a rotating object such as an engine crankshaft (not shown). The target wheel 10 has three teeth 12, 14, 16 equally spaced along its periphery and separated by slots 18, 20, 22.

A biasing magnet 24 is positioned adjacent to the periphery of the target wheel 10. First, second and third sensing elements 26, 28, 30 are sequentially mounted on the surface of the biasing magnet 24, adjacent to the target wheel 10. The spacing between the first and second sensing elements 26, 28 is equal to the spacing between the second and third sensing elements 28, 30. Because of the equal spacing, the output signals of the sensing elements are equally phase shifted by angles corresponding to their positions as illustrated in FIG. 1.

In a preferred embodiment, the three sensing elements 26, 28, are magnetoresistors. The magnetoresistors are made from indium antimonide (InSb). By using InSb magnetoresistors, output signals with a peak-to-peak voltage in the order of several 100 mV can be generated without amplification.

Figure 2:
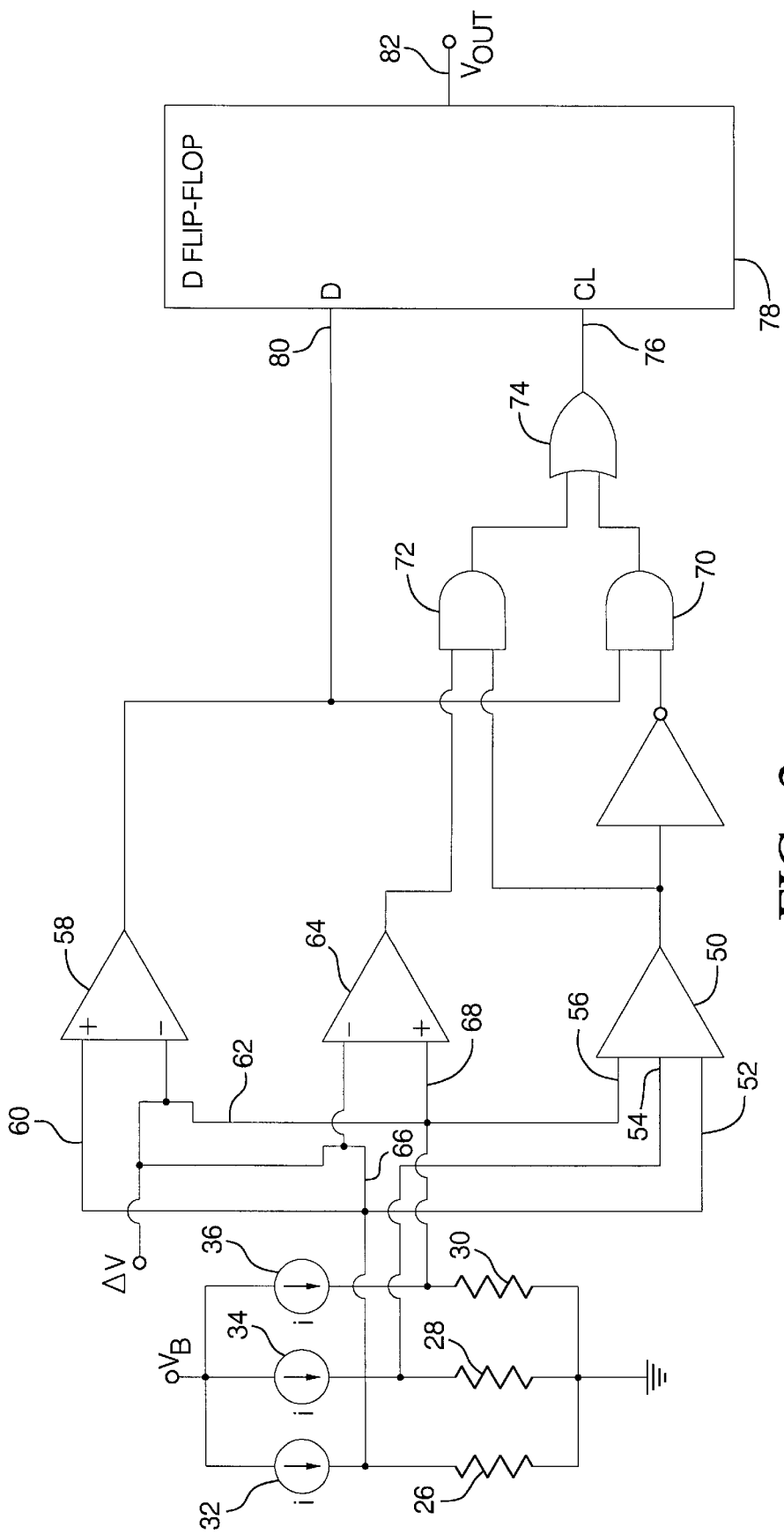
FIG. 2 is a schematic diagram of an interface circuit for generating and processing analog signals from associated sensing elements.

FIG. 2 illustrates an interface circuit for generating and processing the output signals from the magnetoresistors 26, 28, 30. The magnetoresistors 26, 28, 30 have resistances which vary in the presence of a varying magnetic flux, which in turn varies in response to the passage of teeth 12, 14, 16 on the target wheel 10 adjacent the biasing magnet 24. By applying constant matched current sources 32, 34, 36 to magnetoresistors 26, 28, 30, respectively, the voltage across the magnetoresistors 26, 28, 30 will cyclically vary in accordance with their cyclically varying resistances.

Figure 3:
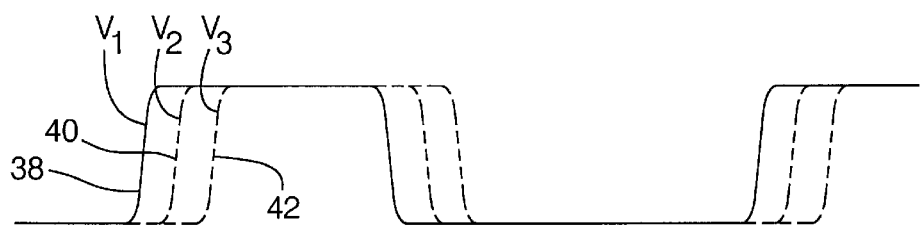
FIG. 3 is a graph of the analog signal output from three sensing elements phase shifted by equal angles corresponding to their spacing.

Referring to FIG. 3, as the tooth 12 approaches the biasing magnet 24, the magnetic flux density between biasing magnet 24 and the half of the wheel 10 in which the tooth 12 is located begins to increase, increasing the resistance of the first magnetoresistor 26. The magnetic flux density is at a maximum when the top of the tooth 12 is positioned directly adjacent to the biasing magnet 24. A voltage output 38 across the first magnetoresistor 26 follows a similar pattern as the resistance of the first magnetoresistor 26.

Conversely, as the tooth 12 passes by the biasing magnet 24, the magnetic flux density begins to decrease, decreasing the resistance of the first magnetoresistor 26. The magnetic flux density is at a minimum when the biasing magnet 24 is positioned adjacent to the bottom of the slot 22. The voltage developed across the first magnetoresistor 26 follows a similar pattern as the first magnetoresistor's decreasing resistance. Outputs 40, 42 of the second and third magnetoresistors 28, 30 are identical to the output 38 of first magnetoresistor 26 except for a given phase shift as a result of delayed sensing of the same tooth 12.

To determine the angular positions of the target wheel, the trailing and leading edges of each tooth must be determined. To determine the leading and trailing edges of each tooth, first, the voltage output 40 across the second magnetoresistor 28 is subtracted from the voltage output 38 across the first magnetoresistor 26 resulting in a first differential signal 44, illustrated in the upper portion of FIG. 4. Then, the voltage output 42 across the third magnetoresistor 30 is subtracted from the voltage output 40 across the second magnetoresistor 28 resulting in a second differential signal 46. And finally, crossover points 48 between the first differential signal 44 and second differential signal 46 are determined resulting in a third differential signal (not shown). The crossover points 48 correspond to the leading and trailing edges of the teeth of the target wheel 10. The magnetoresistors 26, 28, 30 are spaced such that the crossover points 48 occur near the maximum slope of the first and second differential signals 44, 46. The voltages 38, 40, 42 across magnetoresistors 26, 28, 30 are fed into a comparator 50 via signal lines 52, 54, 56. The comparator 50 outputs the third differential signal which is responsive to the crossover points 48 between the first differential signal 44 and the second differential signal 46, illustrated in FIG. 4.

The crossover points 48 between the magnetoresistors 26, 28, 30 occur when the voltages of the first and the second differential signals 44, 46 are equal. The crossover points 48 are not the only points at which the differential signals 44, 46 are equal. Thus, a decoding circuit is required to detect only the desired crossovers corresponding to tooth/slot and slot/tooth transitions.

The voltages 38, 42 across the magnetoresistors 26, 30 are fed into a comparator 58 via signal lines 60, 62. For stability and noise immunity, the comparator 58 uses a small positive threshold voltage _V, e.g. 10–20 mV, in its switching so that its output will switch from a low voltage to a high voltage when its positive (+) input is greater than its negative (−) input by the value _V. Similarly, its output will switch from a high voltage to a low voltage when its negative (−) input is greater than its positive (+) input by the value _V. The voltages 38, 42 across the magnetoresistors 26, 30 are also fed into a comparator 64 via signal lines 66, 68. The comparator 64 operates similarly to the comparator 58. The comparators 58, 64 provide a windowing input for AND gates 70, 72. AND gate 70 permits a logic high output when the comparator 58 generates a logic high output and a crossover point 48 occurs, thereby outputting the crossover points corresponding to a slot/tooth transition. AND gate 72 permits a logic high output when the comparator 64 generates a logic high output and a crossover point 48 occurs, thereby outputting the crossover points corresponding to a tooth/slot transition.

The outputs of AND gates 70, 72 are combined via an OR gate 74 to form the clock signal 76 for a D flip-flop 78. The output of the comparator 58 serves as a data input 80 for the D flip-flop 78. $V_{Out}$ 82 is a reflection of the data input 80 which changes at the rising edge of the clock signal 76.

Figure 4:
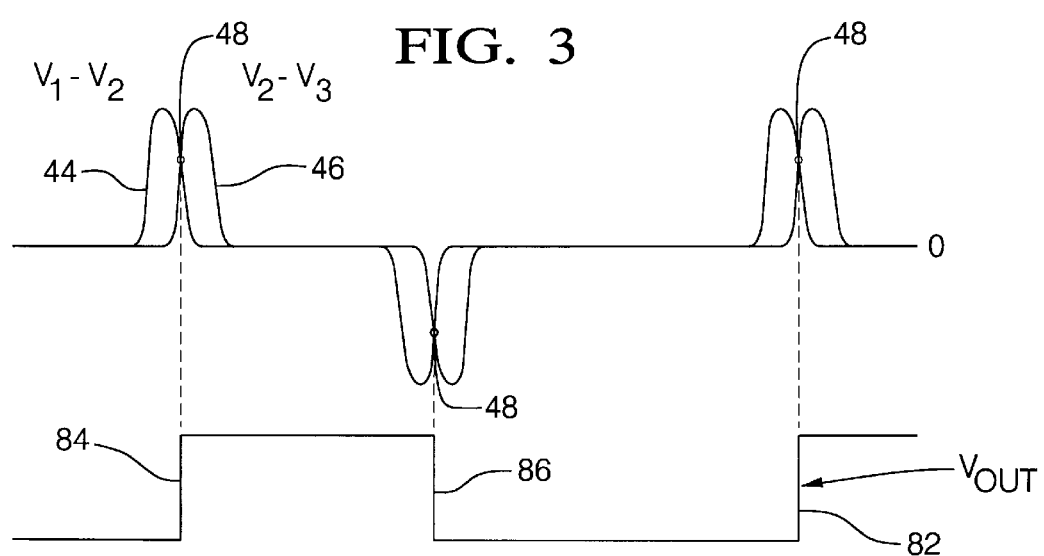
FIG. 4 is a graph of a binary output of the interface circuit of FIG. 2 and the relationship of the binary output to the crossover points of differential signals between adjacent pairs of sensing elements.

The binary output of $V_{out}$ 82 is illustrated in the lower portion of FIG. 4. The leading and trailing edges 84, 86 of the binary pulses correspond to crossover points 48 illustrated in FIG. 4. The crossover points 48 correspond with the angular positions of the target wheel. This information is then used to determine the angular speed and/or position of the target wheel.

Parameters affecting the magnetoresistors such as temperature and air gap variations may affect the peak-to-peak voltages of the individual magnetoresistor analog signals, but their corresponding voltage difference will remain equal to the peak-to-peak voltage, and the crossover points will occur at the same angular positions of the target wheel. Because the crossover points do not vary with temperature and the air gap, the present invention provides an accurate means of detecting precise angular positions of the target wheel.

A method for detecting the angular positions of a rotating ferromagnetic target wheel having teeth, separated by slots, along its periphery includes the following steps. Voltage outputs are generated across first, second and third sensing elements having an amplitude that changes in response to the passage of each leading and trailing edge of each tooth adjacent the respective elements. A first differential signal is found between the voltage outputs across the first and second sensing elements. A second differential signal is found between the voltage outputs across the second and third sensing elements. Crossover points are located between the first differential signal and the second differential signal. Finally, the crossover points corresponding to the leading and trailing edges of the teeth which indicate the angular positions of the target wheel are determined.

While the invention has been described by reference to a preferred embodiment, it should be understood that numerous changes could be made within the spirit and scope of the inventive concepts described. Accordingly it is intended that the invention not be limited to the disclosed embodiment, but that it have the full scope permitted by the language of the following claims.

What is claimed is:

1. A device for sensing angular positions of a rotating ferromagnetic target wheel having teeth, separated by slots, circumferentially spaced around the periphery of the target wheel, said device comprising:

a magnetic sensor having a biasing magnet positioned adjacent the periphery of the target wheel;

first, second and third sensing elements positioned adjacent the periphery of the target wheel and providing first, second and third signals each having an amplitude that changes in response to the passage of each leading and trailing edge of each tooth adjacent the respective elements;

the first, second and third sensing elements being sequentially positioned with the second sensing element intermediate the first and third sensing elements and equally spaced so that they generate three sequential signals equally phase shifted by angles corresponding to their spacing;

first differential circuitry responsive to the first sensing element signal and the second sensing element signal for providing a first differential signal;

second differential circuitry responsive to the second sensing element signal and the third sensing element signal for providing a second differential signal;

third differential circuitry responsive to the first differential signal and the second differential signal for providing a third differential signal responsive to crossover points between the first differential signal and the second differential signal; and decoder circuitry coupled to the third differential signal for producing an output signal indicating the crossover points which correspond to the leading and trailing edges of each tooth of the target wheel.

2. A device as in claim 1 wherein the decoding means comprise:

a first comparator responsive to the first sensing element signal and the third sensing element signal for providing a respective signal being logically high when the first sensing element signal is greater than the third sensing element signal;

a second comparator responsive to the first sensing element signal and the third sensing element signal for providing a respective signal being logically high when the third sensing element signal is greater than the first sensing element signal; and combinational logic circuitry responsive to the first and second comparator signals effective to selectively gate portions of the third differential signal which correspond to the leading and trailing edges of each tooth of the target wheel.

3. A device as in claim 1 wherein said first, second and third sensing elements are magnetoresistors.

4. A device as in claim 3 wherein the magnetoresistors are made from indium antimonide.

5. A device as in claim 3 wherein the magnetoresistors are spaced such that the crossover points between the first and second differential signals occur near the maximum slope of the first and second differential signals.

6. A method for detecting angular positions of a rotating ferromagnetic target wheel corresponding to leading and trailing edges of teeth, separated by slots, disposed along the periphery of the target wheel comprising the steps of:

providing sequentially positioned first, second and third sensing elements with the second sensing element intermediate the first and third sensing elements, all such elements being characterized by output signal amplitudes that change in response to the passage of the leading and trailing edges of each tooth adjacent the respective elements;

generating a first differential signal between the output signal amplitudes across the first and second sensing elements;

generating a second differential signal between the output signal amplitudes across the second and third sensing elements;

determining crossover points of the first differential signal and the second differential signal; and determining which of the crossover points correspond to the leading and trailing edges of the teeth to thereby indicate angular positions of the target wheel.

7. A method as in claim 6 wherein the step of determining crossover points between the first differential signal and the second differential signal comprises the step of:

generating a third differential signal between the first and second differential signals.

8. A method as in claim 6 wherein the step of determining which of the crossover points correspond to the leading and trailing edges of the teeth comprises the step of:

propagating only those crossover points occurring between immediately-adjacent, same-sense changes in the output signal amplitudes of the first and third sensing elements.

* * * * *